US012620721B2

(12) United States Patent
Brock

(10) Patent No.: US 12,620,721 B2
(45) Date of Patent: May 5, 2026

(54) LOW-PROFILE, LOW-OBSERVABLE, WIDE-BAND, AZIMUTHALLY-OMNI-DIRECTIONAL MONOPOLE ANTENNA

(71) Applicant: The United States of America, as represented by the Secretary of the Navy, Arlington, VA (US)

(72) Inventor: David Walker Brock, San Diego, CA (US)

(73) Assignee: United States of America, as represented by the Secretary of the Navy, Washington, DC (US)

( * ) Notice: Subject to any disclaimer, the term of this patent is extended or adjusted under 35 U.S.C. 154(b) by 129 days.

(21) Appl. No.: 18/657,269

(22) Filed: May 7, 2024

(65) Prior Publication Data

US 2025/0350036 A1 Nov. 13, 2025

(51) Int. Cl.
*H01Q 13/10* (2006.01)
*H01Q 17/00* (2006.01)

(52) U.S. Cl.
CPC ............ *H01Q 13/10* (2013.01); *H01Q 17/00* (2013.01)

(58) Field of Classification Search
CPC .. H01Q 1/36; H01Q 1/42; H01Q 5/50; H01Q 5/335; H01Q 5/357; H01Q 9/36; H01Q 17/00; H01Q 21/205; H01Q 13/00; H01Q 13/02; H01Q 13/08-10
See application file for complete search history.

(56) References Cited

U.S. PATENT DOCUMENTS

2018/0241124 A1* 8/2018 Jamaly ..................... H01Q 5/55
2021/0280988 A1* 9/2021 Sundararajan ......... H01Q 21/08

* cited by examiner

*Primary Examiner* — Dimary S Lopez Cruz
*Assistant Examiner* — Marin Stoytchev Stoytchev
(74) *Attorney, Agent, or Firm* — Naval Information Warfare; Kyle Eppele; J. Eric Anderson

(57) ABSTRACT

A low-profile antenna comprising a ground plane, a center hub, a plurality of arms, and a conductive ring. The center is hub disposed above the ground plane. The plurality of arms extend radially from the center hub. Each arm of the plurality of arms is conductive, has a uniform thickness, and has an upper and a lower surface. Each lower surface has an exponential taper that flares away from the ground plane such that any given arm and a corresponding image of the given arm below the ground plane form a tapered-slot antenna element. The plurality of arms are shaped such that the upper surfaces conform to contours of a bowl shape. The conductive ring is disposed parallel to the ground plane and is electrically connected to distal ends of each of the plurality of arms at a rim of the bowl shape.

20 Claims, 9 Drawing Sheets

LOW-PROFILE, LOW-OBSERVABLE, WIDE-BAND, AZIMUTHALLY-OMNI-DIRECTIONAL MONOPOLE ANTENNA

FEDERALLY-SPONSORED RESEARCH AND DEVELOPMENT

The United States Government has ownership rights in the invention claimed herein. Licensing and technical inquiries may be directed to the Office of Research and Technical Applications, Naval Information Warfare Center Pacific, Code 72110, San Diego, CA, 92152; voice (619) 553-5118; NIWC_Pacific_T2@us.navy.mil. Reference Navy Case Number 210272.

BACKGROUND OF THE INVENTION

The invention claimed herein relates to radio frequency (RF) antennas. Large antennas, while effective/efficient in many instances, can be unsightly and result in unwanted reflections of incident RF radiation. There is a need for a low-profile antenna that can operate over a wide bandwidth.

SUMMARY

Disclosed herein is a low-profile antenna comprising a ground plane, a center hub, a plurality of arms, and a conductive ring. The center is hub disposed above the ground plane. The plurality of arms extend radially from the center hub. Each arm of the plurality of arms is conductive, has a uniform thickness, and has an upper and a lower surface. Each lower surface has an exponential taper that flares away from the ground plane such that any given arm and a corresponding image of the given arm below the ground plane form a tapered-slot antenna element. The plurality of arms are shaped such that the upper surfaces conform to contours of a bowl shape. The conductive ring is disposed parallel to the ground plane and is electrically connected to distal ends of each of the plurality of arms at a rim of the bowl shape.

Another embodiment of the low profile antenna is disclosed herein as comprising a ground plane, a plurality of arms, and a conductive ring. The arms are equidistantly-spaced from each other and extend radially from a center axis. Proximal ends of the arms are electrically connected in parallel to a center hub, which is in turn connected to a feed line. Each arm of the plurality of arms is conductive, has a uniform thickness, and has an upper and a lower surface. Each lower surface substantially conforms to an exponential curve that flares away from the ground plane such that any given arm of the plurality of arms and a corresponding image of the given arm below the ground plane form a tapered-slot antenna element. The upper surfaces of the arms conform to a contour of a hypothetical bowl shape. The conductive ring is disposed parallel to the ground plane and is electrically connected to distal ends of each of the plurality of arms. The conductive ring represents a rim of the hypothetical bowl shape and a base of the hypothetical prolate ellipsoid dome.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

The disclosed antenna below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

References in the present disclosure to "one embodiment," "an embodiment," or any variation thereof, means that a particular element, feature, structure, or characteristic described in connection with the embodiments is included in at least one embodiment. The appearances of the phrases "in one embodiment," "in some embodiments," and "in other embodiments" in various places in the present disclosure are not necessarily all referring to the same embodiment or the same set of embodiments.

As used herein, the terms "comprises," "comprising," "includes," "including," "has," "having," or any variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

Additionally, use of words such as "the," "a," or "an" are employed to describe elements and components of the embodiments herein; this is done merely for grammatical reasons and to conform to idiomatic English. This detailed description should be read to include one or at least one, and the singular also includes the plural unless it is clearly indicated otherwise.

Figure 1A:
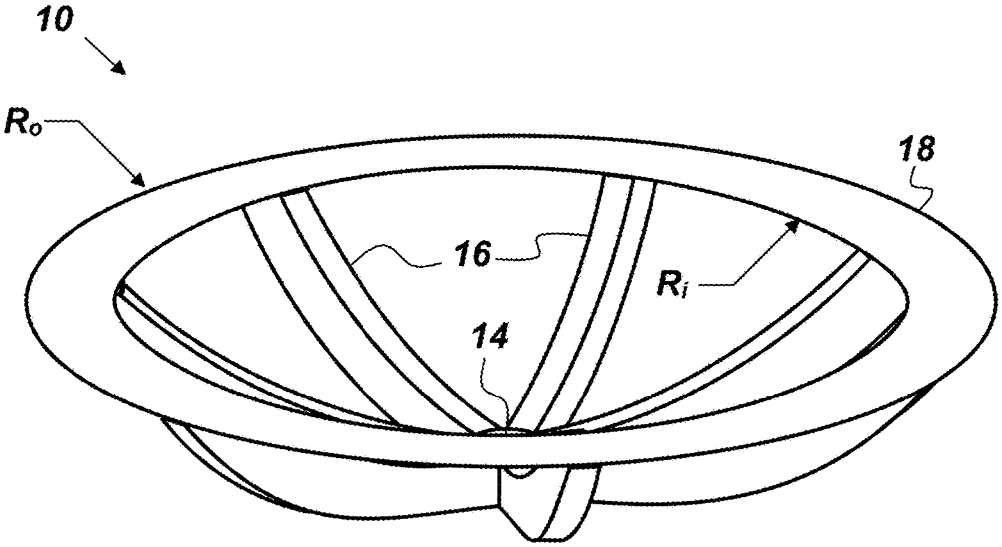
FIGS. 1A and 1B are perspective-view illustrations of an embodiment of a low-profile antenna.
Figure 1B:
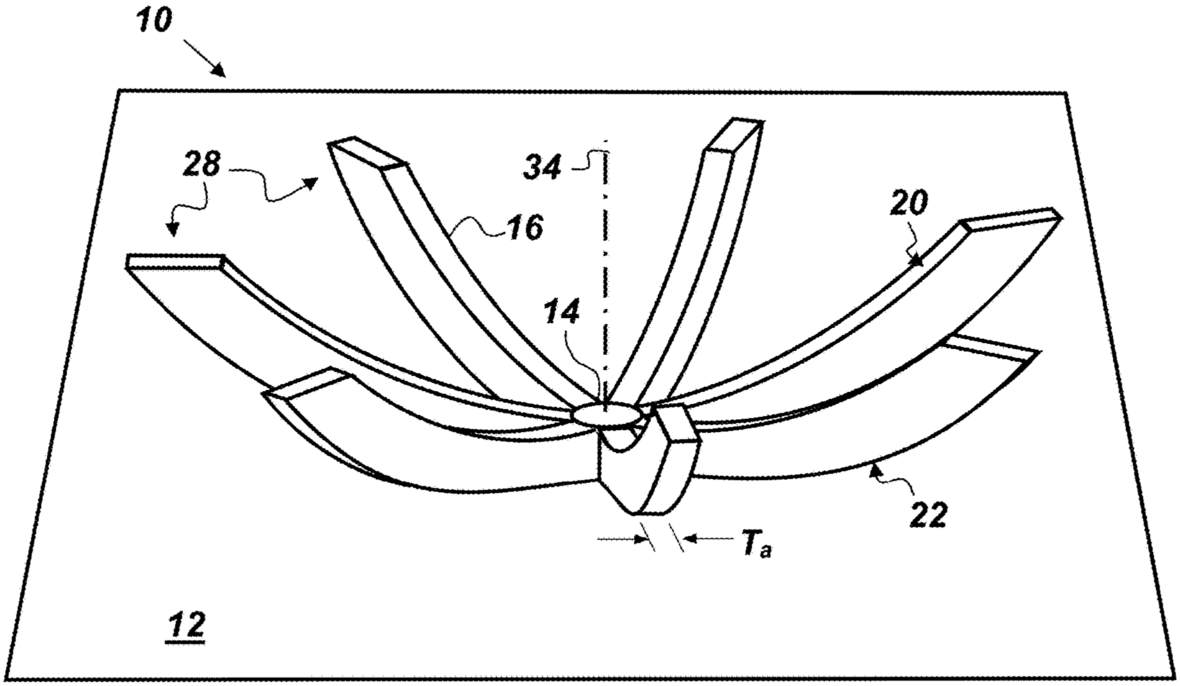

FIGS. 1A and 1B are perspective-view illustrations of a seven-arm embodiment of a low-profile antenna 10 that comprises, consists of, or consists essentially of a ground plane 12, a center hub 14, a plurality of arms 16, and a conductive ring 18. FIG. 1B shows this embodiment of the low-profile antenna 10 without the conductive ring 18 to aid visibility of the other components. The center hub 14 may be disposed above the ground plane 12, an embodiment of which is depicted in FIG. 1B. The plurality of arms 16 extends radially from the center hub 14. Each arm 16 is conductive, has a uniform thickness Ta, and has an upper and a lower surface 20 and 22 respectively. The arms 16, the conductive ring 18, the ground plane 12, and the center hub 14 may be made of any conductive material. Suitable methods of manufacturing the conductive components of the low-profile antenna 10 include, but are not limited to, using computer numerical controlled (CNC) tool(s) to fabricate the conductive arms 16, the ring 18, and the center hub 14 out of a monolithic piece of conductive metal, fabricating the conductive arms 16, the ring 18, and the center hub 14 separately out of metal and then fastening them together via welding, soldering, conductive epoxy, etc., using additive manufacturing processes (e.g., 3D-printing) to create the conductive arms 16, the ring 18, and the center hub 14 either out of a conductive material or out of a non-conductive base material and then coating the base material with a conductive outer layer.

Figure 2:
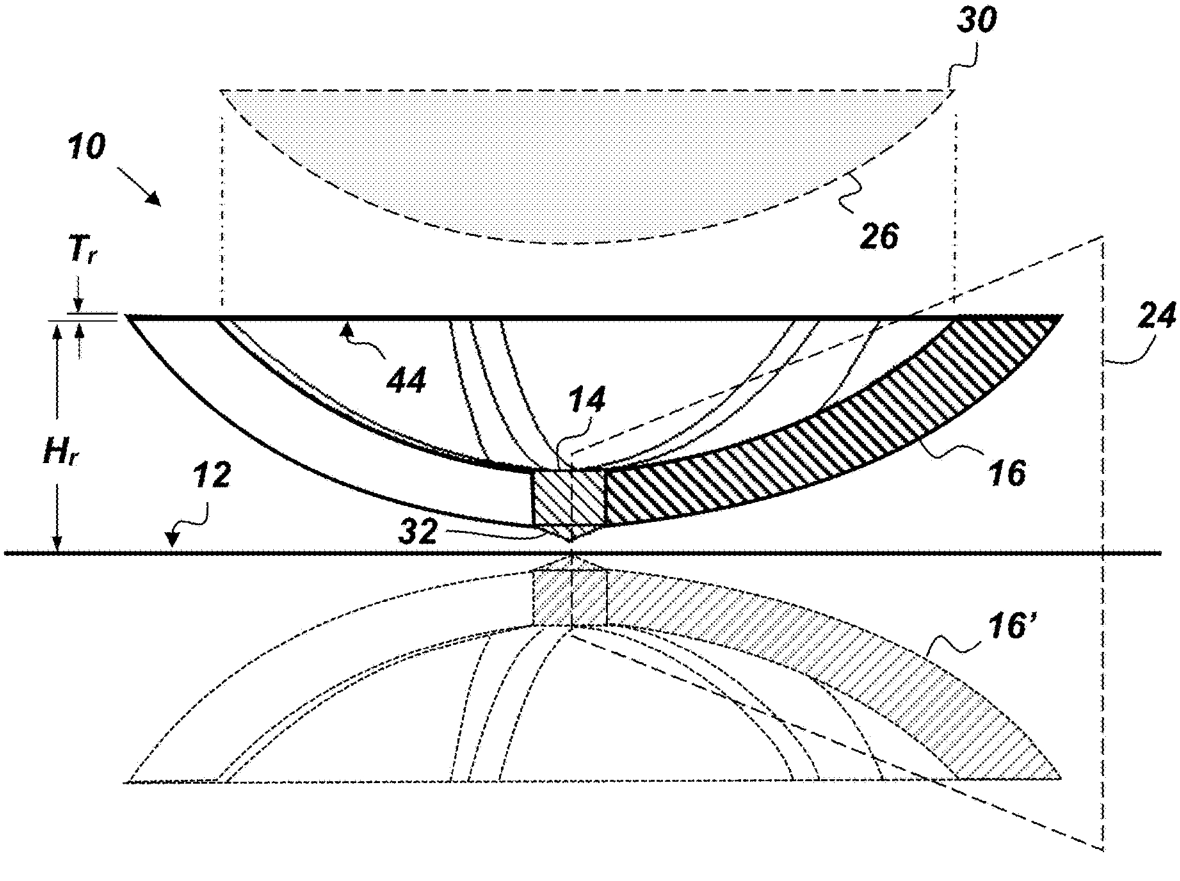
FIG. 2 is a cross-sectional side-view of the embodiment of the low-profile antenna shown in FIGS. 1A and 1B.

FIG. 2 is a cross-sectional side-view of the embodiment of the low-profile antenna 10 shown in FIGS. 1A and 1B. As shown in FIG. 2, each lower surface 22 has an exponential taper that flares away from the ground plane 12 such that any given arm 16 and a corresponding image 16' of the given arm 16 below the ground plane 12 form a tapered-slot antenna element 24. The plurality of arms 16 are shaped such that the upper surfaces 20 conform to contours of an ellipsoidal bowl shape 26. The conductive ring 18 is electrically connected to distal ends 28 of each arm 16 (such as shown in FIG. 1B) at, or slightly above, a rim 30 of the bowl shape 26. As shown in FIG. 2, the conductive ring 18 may be disposed parallel to the ground plane 12. Also depicted in FIG. 2 is a feed section 32 disposed above the ground plane 12 by a distance $D_1$, shown in FIG. 3A. The embodiment of the low-profile antenna 10 shown in FIGS. 1A and 2 is a vertically polarized and azimuthally omnidirectional monopole antenna, which may be mounted in an upright position on a horizontal or nearly horizontal embodiment of the ground plane 12. The plurality of arms 16 are connected to the center hub 14 and project radially outward from a central axis 34.

Each tapered-slot element 24 of the array has its own individual gain pattern, which has a maximum gain value along the direction of the tapered slot. By combining a sufficient number of tapered-slot elements, an azimuthally uniform gain pattern can be achieved, with the objective of a gain of at least 0 dBi. The input impedance of the low-profile antenna 10 will be that of the parallel combination of the individual arms 16. The input impedance of the low-profile antenna 10 may be set to a desired value, which, for example, could be 50 ohms, by selecting the thickness and exponential taper of the individual arms 16. The feed section 32 can be given a given a conical shape (such as depicted in FIG. 2) so that its impedance matches that of the parallel combination of the arms 16. The conductive ring 18 provides capacitive loading to the low-profile antenna 10. In the embodiment of the low-profile antenna 10 shown in FIG. 2, the seven arms 16 are separated by (360/7), or approximately 51.43 degrees, and each arm 16 has a thickness Ta of approximately 4.67 mm (0.184 inches), to give each arm an impedance of 350 ohms. Each arm 16, with the dimensions and thickness given above, together with its image below the ground plane 12, forms a corresponding tapered-slot antenna element 24, with an impedance of 350 ohms.

Figure 3A:
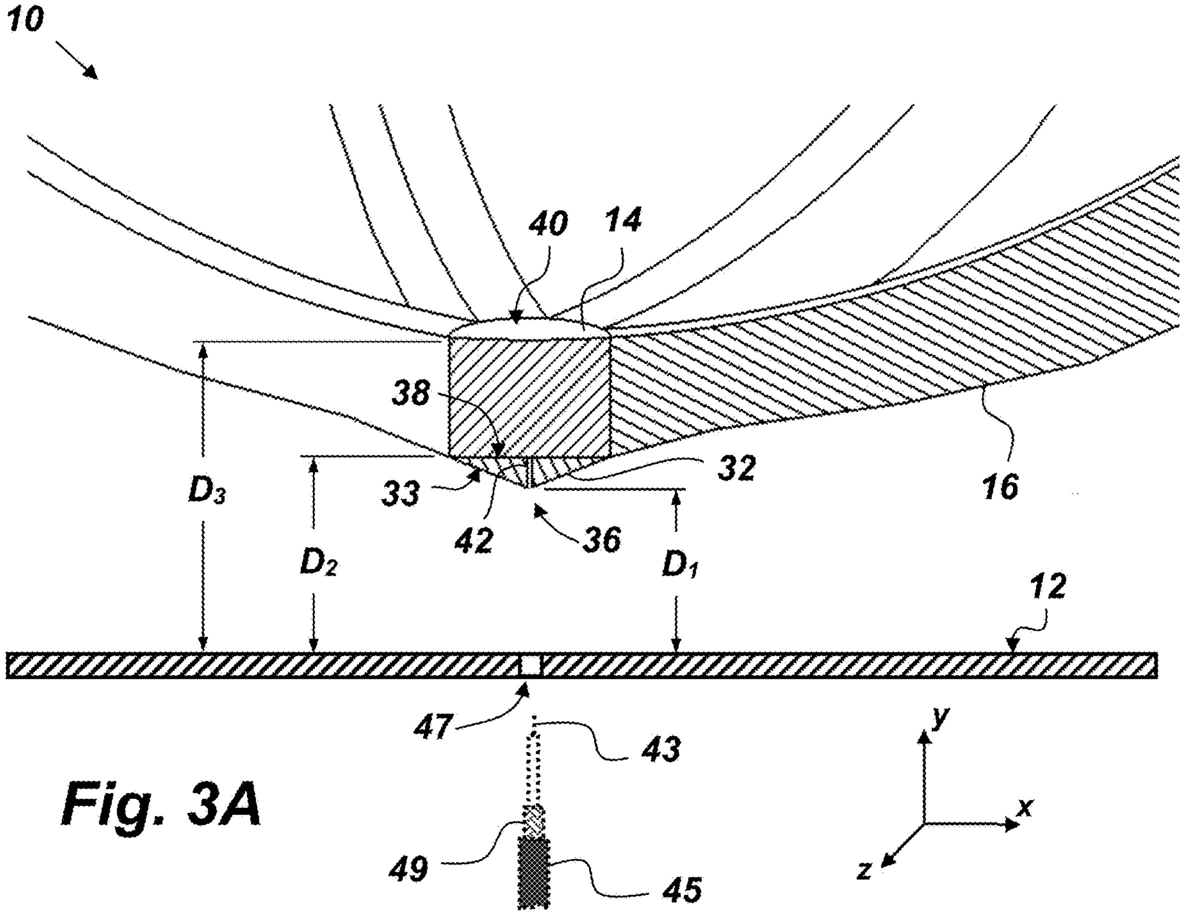
FIGS. 3A and 3B are partial cross-sectional views of the embodiment of the low-profile antenna shown in FIGS. 1A, 1B, and 2.
Figure 3B:
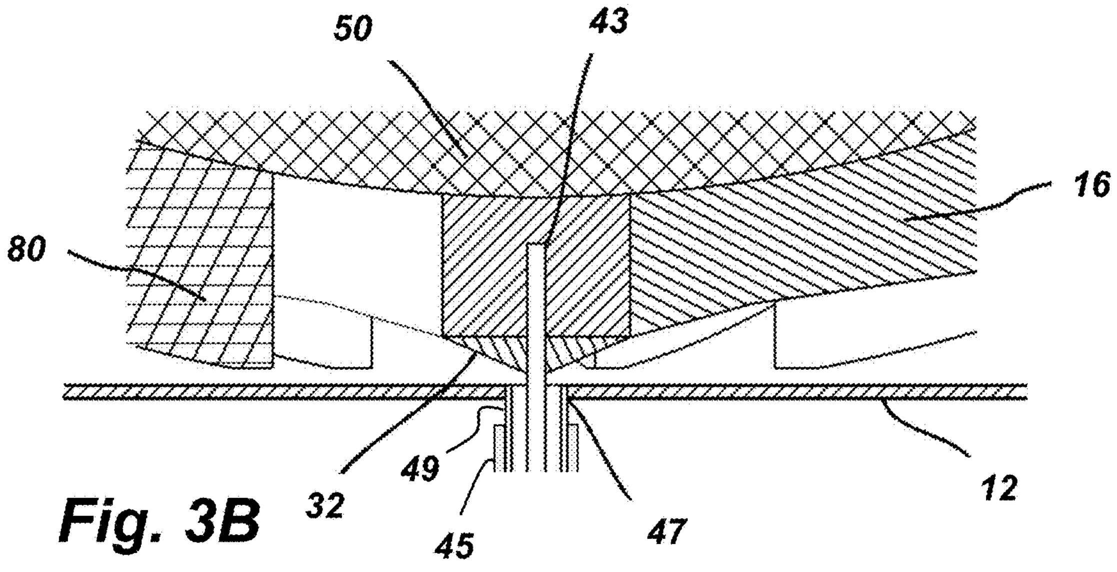

FIGS. 3A and 3B are partial cross-sectional views of the embodiment of the low-profile antenna 10 shown in FIGS. 1A, 1B, and 2, further showing a close-up view of the center hub 14 and the feed section 32, which, in this case, is a metal feed cone having a vertex 36 that is separated from the ground plane 12 by a distance $D_1$, and having a top surface that is separated from the ground plane 12 by a distance $D_2$. In the example embodiment of the feed section 32 shown in FIG. 3A, the metal feed cone has a radius of 5.3848 mm (0.212 inches), and $D_1$ is 0.127 millimeters (mm) (0.005 inches) and $D_2$ is 2.4384 mm (0.096 inches), resulting in the height of the feed cone being 2.3114 mm (0.091 inches). The angle of the surface of the feed cone from the central axis 34 may be determined by the equation: arctan (0.212/0.091) =66.79 degrees. For this example value of the angle of the feed cone provided above, the resulting input of the feed cone from its feed point, located at vertex 36, is given by the formula: K=120*ln(cot(66.79/2))=50.0 ohms, which is a desired value.

The example embodiment of the center hub 14 shown in FIGS. 3A and 3B is cylindrical with a radius of 5.4102 mm (0.213 inches) and a lower surface 38 that connects with the feed section 32. An upper surface 40 of the center hub 14 conforms to the bottom of the bowl shape 26, which may be, for example, the lower surface of a prolate ellipsoid separated from the ground plane 12 by a distance $D_3$ of approximately 10.44 mm (0.411 inches) and defined by the equation:

$$(x/3.542)^\wedge 2+((y-4.261)/3.85)^\wedge 2+(z/3.542)^\wedge 2=1 \quad \text{(Eq 1)}$$

where x, y, and z are coordinates of an x-y-z mutually-orthogonal coordinate axes system. A small-diameter hole 42 is located at the vertex 36, into which may be inserted the center conductor 43 of a coaxial cable 45, that comes up from below the ground plane 12, thereby electrically connecting the center conductor 43 to the low profile antenna 10. The center conductor 43 may be conductively connected to the feed section 32 via any means known in the art, including, but not limited to, one or more of fasteners, an interference fit with the hole 42, and conductive epoxy.

Figure 4:
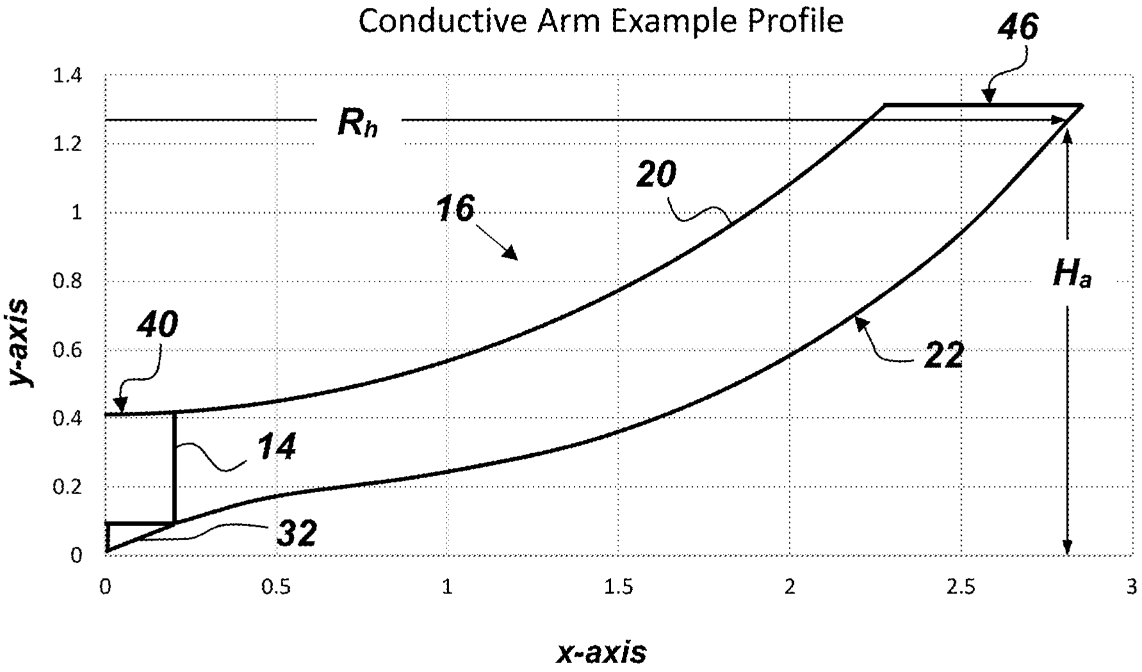
FIG. 4 is a plot of points defining a profile of an embodiment of a conductive arm of a low-profile antenna.

FIG. 4 is a plot of points defining the profile of an embodiment of a given conductive arm 16 that is disposed in a plane that is parallel to the x-axis. In FIG. 4, the ground plane 12 is disposed in an x-z plane and located at y=0. For the given conductive arm 16 shown in FIG. 4, the lower surface 22 has a horizontal radius $R_h$ from the center axis 34, which corresponds with the y-axis, and height $H_a$ above the ground plane 12, and can be defined by the following data points:

$(x_1, y_1)$=(5.38 mm, 2.44 mm) or (0.212 inches, 0.096 inches)

$(x_2, y_2)$=(12.47 mm, 4.34 mm) or (0.491 inches, 0.171 inches)

$(x_3, y_3)$=(24.92 mm, 6.12 mm) or (0.981 inches, 0.241 inches)

$(x_4, y_4)$=(37.39 mm, 8.94 mm) or (1.472 inches, 0.352 inches)

$(x_5, y_5)$=(49.86 mm, 14.3 mm) or (1.963 inches, 0.563 inches)

$(x_6, y_6)$=(62.31 mm, 22.86 mm) or (2.453 inches, 0.900 inches)

$(x_7, y_7)$=(72.47 mm, 33.3 mm) or (2.853 inches, 1.311 inches)

A top surface 46 of the first arm 16, for this example, is illustrated in FIG. 4 and can be defined by the points:

$(x_8, y_8)$=(72.47 mm, 33.3 mm) or (2.853 inches, 1.311 inches)

$(x_9, y_9)$=(57.81 mm, 33.3 mm) or (2.276 inches, 1.311 inches)

The upper surface 20 of each arm 16 may conform to the contours of the prolate ellipsoid described above in Equation 1.

Continuing with the description of the seven-arm embodiment of the low-profile antenna 10 shown in FIGS. 1A, 1B, 2, 3A, and 3B, each arm 16 having an input impedance of 350 ohms is connected to the center hub 14 resulting in a combined parallel input impedance of 50 ohms, which matches the input impedance of the feed section 32. The conductive ring 18 on top of the seven arms 16, as shown in FIG. 1A, provides capacitive loading for the seven arms 16. The conductive ring 18, in this embodiment, has a thickness $T_r$ of 0.127 mm (0.005 inches), a bottom surface 44 of the conductive ring 18 is at a height $H_r$ of 33.2994 mm (1.311 inches) from the ground plane 12 (as shown in FIG. 2), the outer radius $R_o$ of the ring is 72.4662 mm (2.853 inches), and the inner radius Ri is 51.4096 mm (2.024 inches). Embodiments of the low-profile antenna 10 may be constructed where the distance $D_1$ is no greater than 0.127 mm and $(H_r+T_r)$ is no greater than 33.5 mm.

Figure 5A:
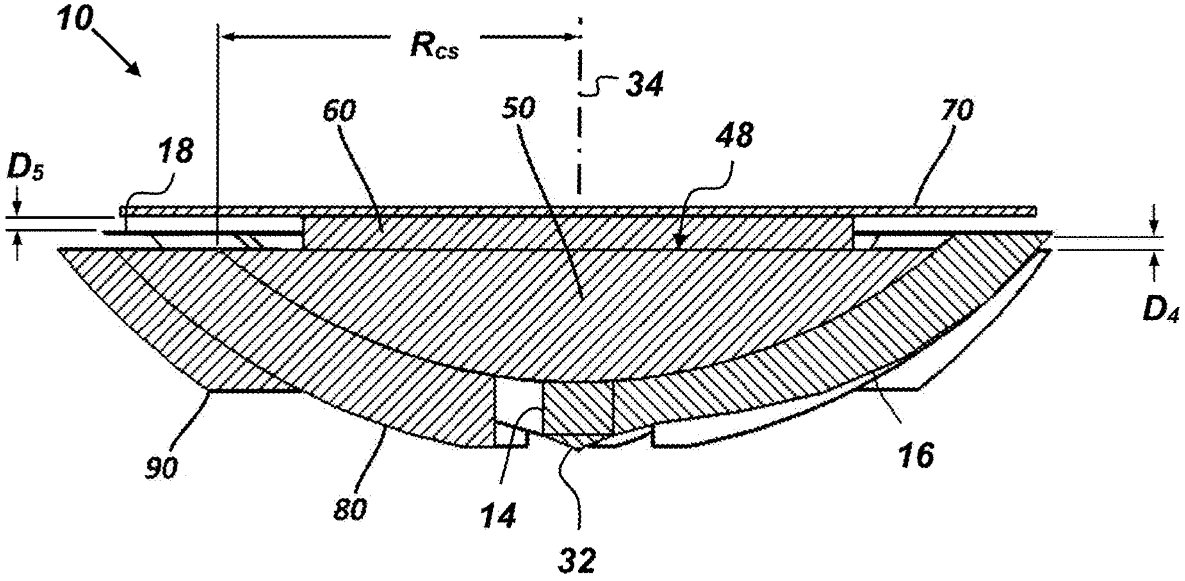
FIG. 5A is a cross-sectional, side-view of another embodiment of a low-profile antenna.
Figure 5B:
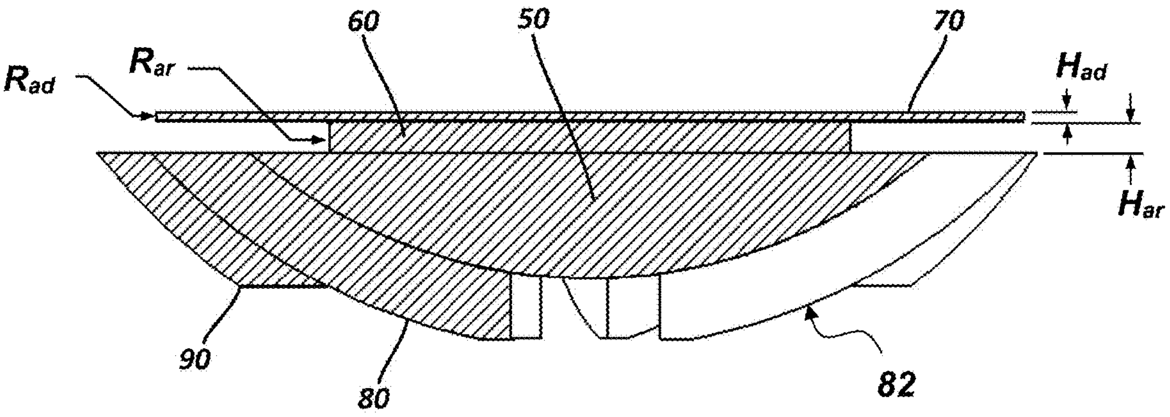
FIG. 5B is a cross-sectional, side-view of RF-absorbing components of an embodiment of a low-profile antenna.

FIG. 5A is a cross-sectional, side-view of another embodiment of the low-profile antenna 10 further comprising a center absorber 50, an absorber riser 60, an absorber disk 70, interstitial absorbers 80, and outer projections 90, all of which are made of RF-absorbing material such as RF-absorbing dielectric foam. FIG. 5B is a cross-sectional, side-view of the center absorber 50, the absorber riser 60, the absorber disk 70, the interstitial absorbers 80, and the outer projections 90 without showing the conductive portions of low-profile antenna 10 (e.g., conductive arms 16, conductive ring 18, center hub 14, and feed section 32). A suitable example of RF-absorbing material is Eccosorb LS-24, manufactured by DuPont subsidiary Laird.

The center absorber 50 is disposed within and fills an inner section (i.e., bowl shape 26 shown in FIG. 2) of the antenna 10. In the embodiment of the low-profile antenna 10 depicted in FIGS. 5A and 5B, the center absorber 50 may be defined as a prolate ellipsoid dome described by Equation 1, extending from the upper surface 40 of the center hub 14 at y=10.4394 mm (0.411 inches) with x=0 and z=0, to an upper flat circular surface 48 at y=30.7594 mm (1.211 inches) with radius $R_{cs}$=54.9148 mm (2.162 inches). Also in this embodiment, the center absorber 50 is in contact with the upper surfaces 20 of the conductive arms 16, but the upper flat circular surface 48 is separated from the conductive ring 18 by a distance $D_4$ (See FIG. 5A). In one embodiment, the distance $D_4$ is approximately 2.54 mm (0.1 inches).

The absorber riser 60 is disposed on top of the center absorber 50, and may be any desired shape. It is desirable that the absorber riser 60 not touch conductive ring 18. In the embodiment of the low-profile antenna 10 shown in FIGS. 5A and 5B, the absorber riser 60 is cylindrical with an axis that is aligned with the center axis 34, having a radius $R_{ar}$ of 42.0624 mm (1.656 inches) and a height $H_{ar}$ of 5.08 mm (0.2 inches). The height $H_{ar}$ of the absorber riser 60 in this embodiment extends from y=30.7594 mm (1.211 inches) to y=35.8394 mm (1.411 inches).

The absorber disk 70 is disposed on top of absorber riser 60. In the embodiment depicted in FIGS. 5A and 5B, the absorber disk 70 is cylindrical in shape, with its axis aligned with the center axis 34, has a radius $R_{ad}$=70.104 mm (2.760 inches) and a height $H_{ad}$ of 1.27 mm (0.05 inches). The height $H_{ad}$ of the absorber disk 70 in this embodiment extends from y=35.8394 mm (1.411 inches) to y=37.1094 mm (1.461 inches). The absorber disk 70 is spaced above the conductive ring 18 by a distance $D_5$, which in the depicted embodiment is approximately 2.413 mm (0.095 inches).

Figure 6A:
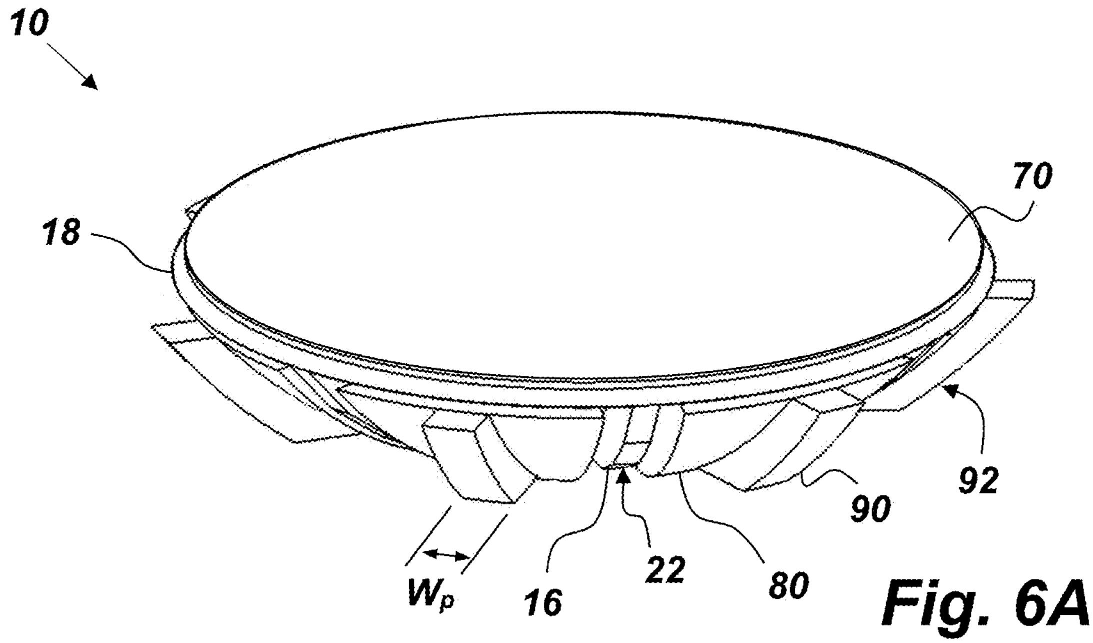
FIGS. 6A and 6B are respectively top and bottom perspective views of the embodiment of the low-profile antenna shown in FIG. 5A.
Figure 6B:
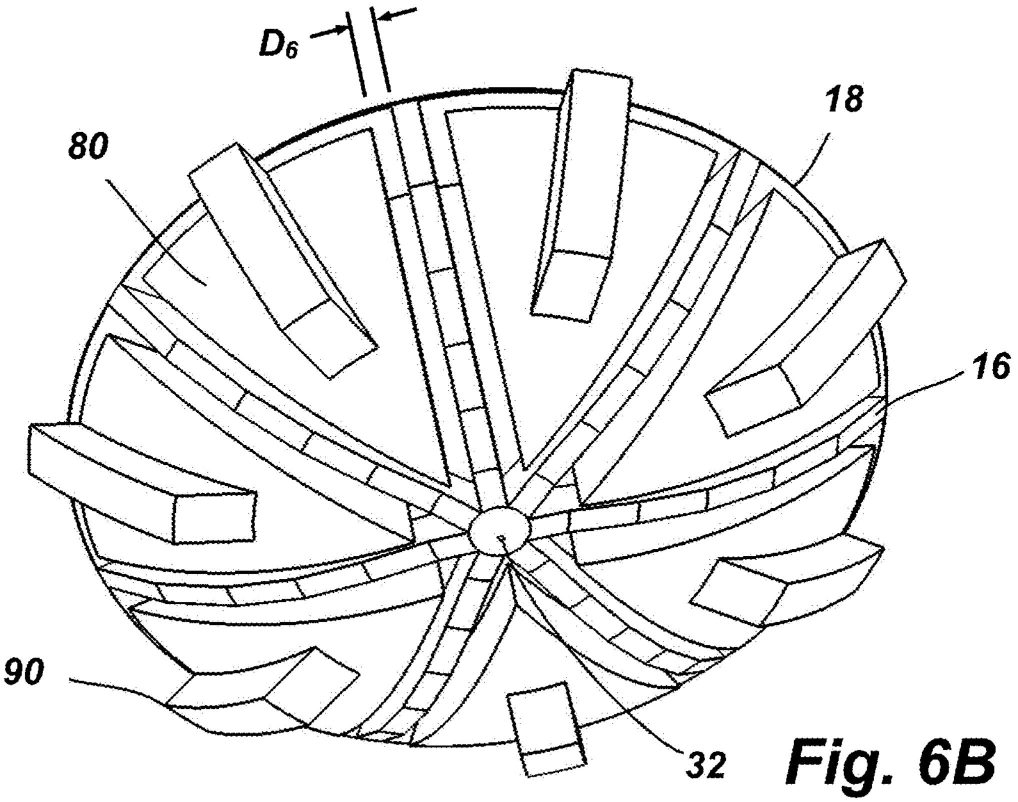

FIGS. 6A and 6B are respectively top and bottom perspective views of the embodiment of the low-profile antenna 10 shown in FIG. 5A. While the lower surfaces 22 of the conductive arms 16 appear to be faceted (i.e., made up of several flat sections), it is to be understood that the low-profile antenna 10 is not so limited. The lower surfaces may be smoothly curved as well. As shown in FIGS. 6A and 6B, an interstitial absorber 80 is disposed between every two conductive arms 16 such that the interstitial absorbers 80 project out from the center absorber 50 between the conductive arms 16. Each interstitial absorber 80 is connected to a corresponding outer projection 90. The interstitial absorbers 80 are spaced equidistantly between the conductive arms 16, and have outer surfaces 82 defined by Equation 2 as follows:

$$(x/3.956)^2+((y-4.261)/4.3)^2+(z/3.956)^2=1 \qquad \text{(Eq. 2)}$$

In the embodiment of the low-profile antenna 10 shown in FIGS. 6A and 6B, each interstitial absorber 80 extends from y=0.0, where it is truncated, up to y=30.7594 mm (1.211 inches). The interstitial absorbers 80 do not touch and are spaced apart from the conductive arms 16 on either side by a distance $D_6$ (see FIG. 6B), which in this embodiment is approximately 4.242 mm (0.167 inches). The interstitial absorbers 80 are also separated from the conductive ring 18 in the y-direction. In the embodiment of the low profile antenna 10 shown in FIGS. 5A, 6A, and 6B, the interstitial absorbers 80 are separated from the conductive ring 18 by the distance $D_4$ (see FIG. 5A).

The outer projections 90 are connected to corresponding interstitial absorbers 80 and are spaced equidistantly between the conductive arms 16. For the example considered here, each outer projection 90 could be described as having a rectangular cross section, extending from approximately y=9.17 mm (0.361 inches) to approximately y=30.76 mm (1.211 inches), and having a width Wp of approximately 10.516 mm (0.414 inches). Outer surfaces 92 of the outer projections 90 in this embodiment conform to contours of an ellipsoid defined by Equation 3 as follows:

$$(x/4.14)^2+((y-4.161)/4.5)^2+(z/4.14)^2=1 \qquad \text{(Eq. 3)}$$

Figure 7A:
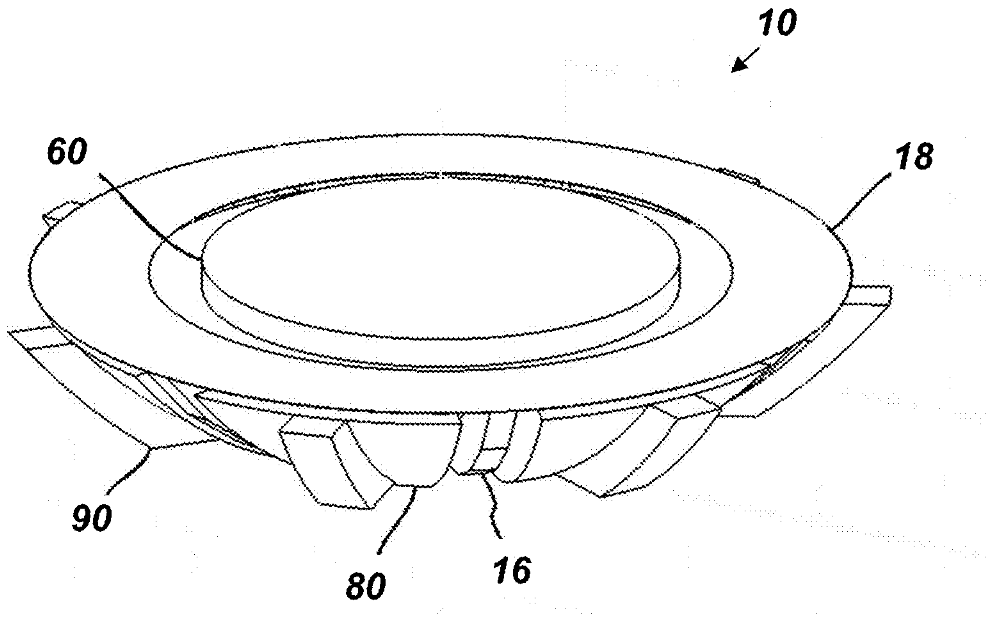
FIGS. 7A and 7B are perspective views of the embodiment of the low-profile antenna shown in FIGS. 5A, 6A, and 6B.
Figure 7B:
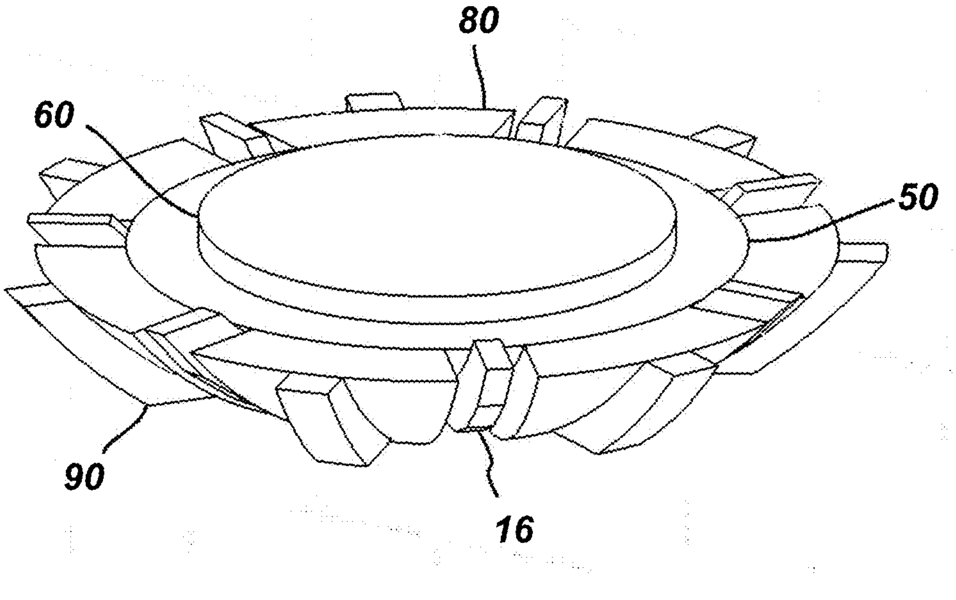

FIGS. 7A and 7B are perspective views of the embodiment of the low-profile antenna 10 shown in FIGS. 5A, 6A, and 6B with various parts removed to facilitate viewing of otherwise-obscured components. In FIG. 7A, the absorber disk 70 has been removed to allow a better view of the ring 18 and the absorber riser 60. In FIG. 7B, the absorber disk 70 and the conductive ring 18 have been removed to allow a better view of the absorber riser 60, the conductive arms 16, and the center absorber 50.

Figure 8:
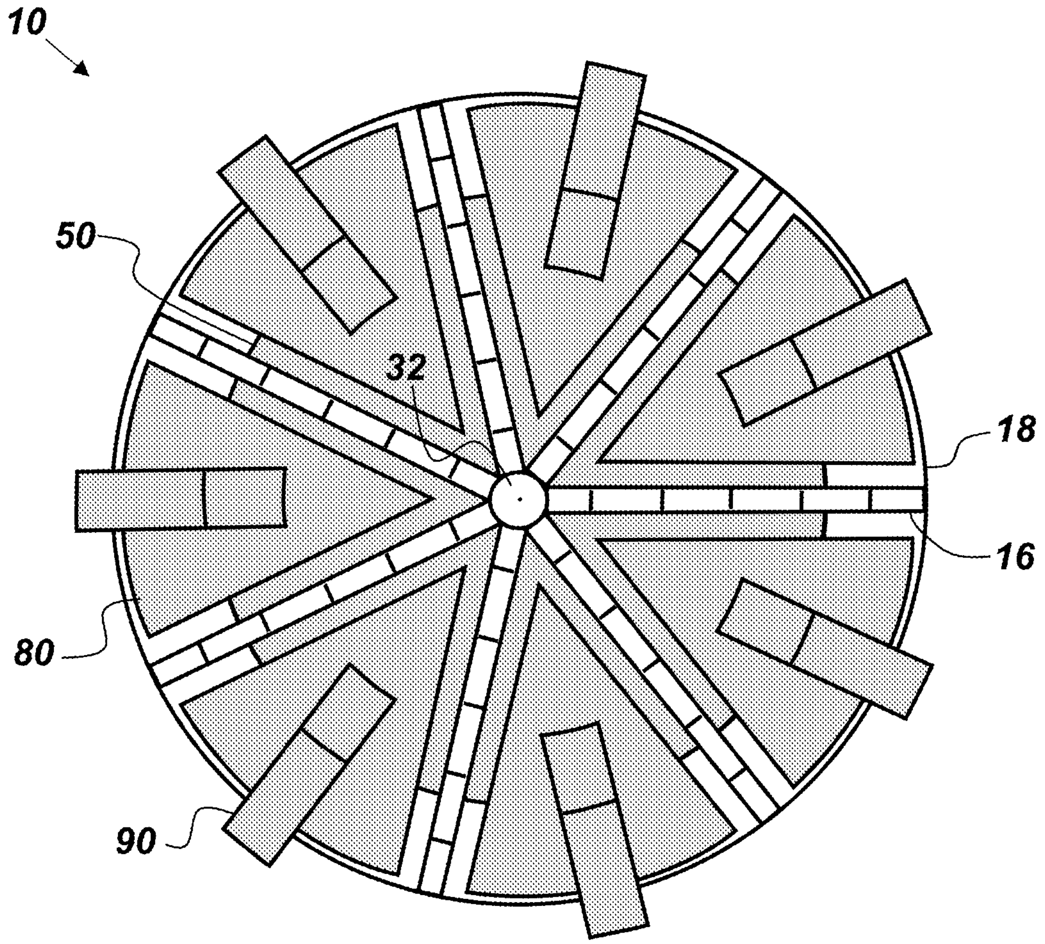
FIG. 8 is a bottom-view illustration of the embodiment of the low-profile antenna shown in FIGS. 5A, 6A, and 6B.

FIG. 8 is a bottom-view illustration of the embodiment of the low-profile antenna 10 shown in FIGS. 5A, 6A, and 6B where the features that are made of RF-absorbing material that are visible in FIG. 8 (i.e., the center absorber 50, the interstitial absorbers 80, and the outer projections 90) are shaded to facilitate viewing. When the low-profile antenna 10 is in receive mode operation, incoming electromagnetic waves (e.g., RF waves) may be incident on one or more of the conductive arms 16. As discussed above, each conductive arm 16, together with its image below the ground plane 12, acts as a tapered-slot or Vivaldi antenna element, with an input impedance of 350 ohms. The conductive ring 18, which is disposed on the top surfaces 46 of the seven conductive arms 16 of this embodiment, provides capacitive loading for the conductive arms 16, which are connected in parallel, forming a combined impedance of 50 ohms, matching the impedance of feed section 32. The RF current then flows down an outer surface 33 of feed section 32 (See FIGS. 3A and 3B), until it reaches connecting hole 42, and then onto the center conductor 43 of coaxial cable 45. The center conductor 43 may be inserted into connecting hole 42 and the coaxial cable 45 may be routed through a hole 47 in ground plane 12. An outer conductor 49 of coaxial cable 45 (e.g., braided conductive shield) may be connected to the ground plane 12. Coaxial cable 45 may carry the RF currents from the low-profile antenna 10 to receiving equipment (not shown).

When the low-profile antenna 10 is in transmit mode, RF currents may be fed from a transmitter (not shown) through the coaxial cable 45. The RF current then flows up the outer surface of feed section 32 (e.g., feed cone), until it reaches the conductive arms 16. The RF current is then divided equally among the conductive arms 16, in this example, seven ways, since there are seven arms in the example embodiment described above. One challenge for the operation of the antenna, for transmitting or receiving, is to reduce the absorption of RF energy by the absorber material. One property of the low-profile antenna 10 that helps it to attain this objective is that most of the RF currents flowing on the surfaces of the conductive arms flows on the undersides of the arms (i.e., the lower surfaces 22), which are on opposite sides of the conductive arms 16 from the center absorber 50.

Figure 9A:
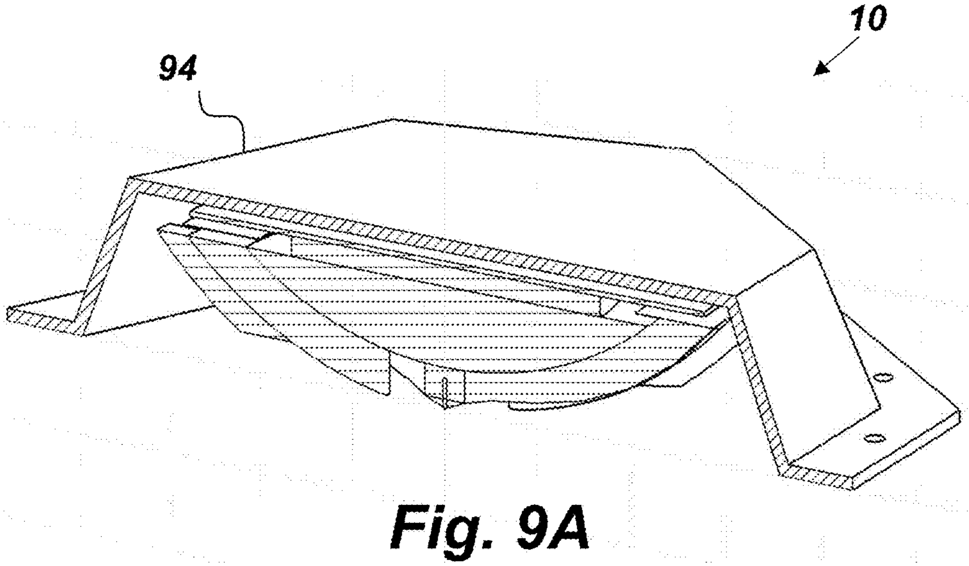
FIGS. 9A and 9B are respectively a cross-sectional, perspective view and a top view of another embodiment of a low-profile antenna.
Figure 9B:
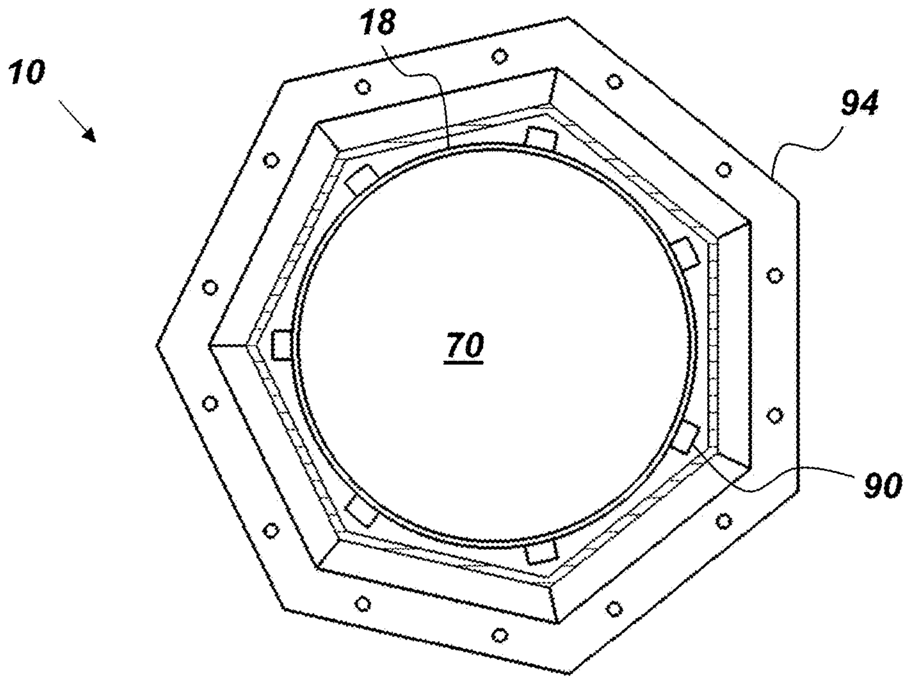

FIGS. 9A and 9B are respectively a cross-sectional, perspective view and a top view of an embodiment of the low-profile antenna 10 showing a housing 94, which is made of RF-transparent material. In FIG. 9B, the top of housing 94 has been removed to facilitate viewing of the low-profile antenna 10 and its position relative to the housing 94. The housing 94 may be used as a structural component to hold the other components of the low-profile antenna 10 in their relative positions.

The gain of the low profile antenna 10 is very uniform with respect to azimuth over the frequency range 0-3 GHZ, with a variation of less than 0.22 dB. The RF-absorbing components reduce the average maximum and minimum gains by about 2 dB over the 0 to 18 GHz frequency range. The low profile antenna 10 may be used with varying degrees of performance up to 18 GHz.

From the above description of the low-profile antenna 10, it is manifest that various techniques may be used for implementing the concepts embodied by the low-profile antenna 10 without departing from the scope of the claims. The described embodiments are to be considered in all respects as illustrative and not restrictive. The method/apparatus disclosed herein may be practiced in the absence of any element that is not specifically claimed and/or disclosed herein. It should also be understood that the low-profile antenna 10 is not limited to the particular embodiments described herein, but is capable of many embodiments without departing from the scope of the claims.

I claim:

1. A low-profile antenna comprising:

a ground plane;

a center hub disposed above the ground plane;

a plurality of arms extending radially from the center hub, wherein each arm of the plurality of arms is conductive, has a uniform thickness, and has an upper and a lower surface, wherein each lower surface has an exponential taper that flares away from the ground plane such that any given arm of the plurality of arms forms half of a tapered-slot antenna element, wherein the plurality of arms are shaped such that the upper surfaces conform to contours of a bowl shape; and a conductive ring disposed parallel to the ground plane and electrically connected to distal ends of each of the plurality of arms at a rim of the bowl shape.

2. The low-profile antenna of claim 1, further comprising a center absorber made of RF-absorbing material and disposed to substantially fill the bowl shape without touching the conductive ring.

3. The low-profile antenna of claim 1, wherein the plurality of arms consists of seven arms.

4. The low-profile antenna of claim 1, further comprising a conductive feed cone having a base that is connected to a bottom of the center hub and having a vertex that is connected to a center conductor of a coaxial feed line such that the plurality of arms are electrically connected in parallel to the center conductor, wherein the vertex is separated from the ground plane by a distance D.

5. The low-profile antenna of claim 4, wherein the distance D is no greater than 0.127 mm and a height H from the ground plane to a top surface of the ring is no greater than 33.5 mm.

6. The low-profile antenna of claim 2, wherein a top of the center absorber is separated from a bottom of the conductive ring by a distance of 2.54 mm.

7. The low-profile antenna of claim 2, further comprising interstitial absorbers made of RF-absorbing material that fill spaces between the plurality of arms without physically touching the plurality of arms.

8. The low-profile antenna of claim 7, wherein each interstitial absorber between two given arms further comprises an outer projection of RF-absorbing material that is equidistantly spaced between the two given arms, has a rectangular cross section and extends beyond the bowl shape and the given space.

9. The low-profile antenna of claim 6, wherein the ring has a thickness of 0.127 mm.

10. The low-profile antenna of claim 1, wherein the center hub, the plurality of arms, and the ring are made of metal-coated 3D-printed material.

11. A low-profile antenna comprising:

a ground plane;

a plurality of arms equidistantly-spaced from each other and extending radially from a center axis, wherein proximal ends of the arms are electrically connected in parallel to a center hub, which is in turn connected to a feed line, wherein each arm of the plurality of arms is conductive, has a uniform thickness, and has an upper and a lower surface, wherein each lower surface substantially conforms to an exponential curve that flares away from the ground plane such that any given arm of the plurality of arms forms half of a tapered-slot antenna element, and wherein the upper surfaces of the arms conform to a contour of a bowl shape; and a conductive ring disposed parallel to the ground plane and electrically connected to distal ends of each of the plurality of arms, wherein the conductive ring is disposed above the bowl shape.

12. The low-profile antenna of claim 11, wherein the contour of the bowl shape is a surface of a first prolate ellipsoid dome defined by rotating an elliptical curve around the center axis.

13. The low-profile antenna of claim 12, further comprising a center absorber made of RF-absorbing material and disposed to substantially fill the first prolate ellipsoid dome without touching the conductive ring.

14. The low-profile antenna of claim 13, wherein the plurality of arms consists of seven arms.

15. The low-profile antenna of claim 14, further comprising seven interstitial absorbers made of the RF-absorbing material, wherein each interstitial absorber substantially fills a space between two given arms without physically touching the two given arms.

16. The low-profile antenna of claim 15, further comprising seven equidistantly-spaced outer projections made of the RF-absorbing material, wherein each outer projection protrudes from a corresponding interstitial absorber, has a rectangular cross section with a thickness that is double a thickness of each of the arms, and has an outer surface bounded by a second prolate ellipsoid dome that is larger than the first prolate ellipsoid dome.

17. The low-profile antenna of claim 16, wherein a distance from the ground plane to a feed line connection point is 0.127 mm, a distance between the ground plane and a top surface of the ring is 33.5 mm, the ring has a thickness of 0.127 mm, and each arm has a thickness of 4.67 mm and an impedance of 350 ohms.

18. The low-profile antenna of claim 17, further comprising a non-conductive housing configured to cover and support the plurality of arms, the ring, the center absorber, the interstitial absorbers, and the outer projections over the ground plane.

19. The low-profile antenna of claim 18, wherein the RF-absorbing material is made of dielectric foam.

20. The low-profile antenna of claim 19, further comprising a feed cone, a base of which is connected to each of the seven arms so as to yield a combined impedance of 50 ohms, wherein a vertex of the feed cone is connected to a center conductor of a coaxial cable, and wherein the ground plane is connected to an outer conductor of the coaxial cable.

* * * * *